US010640141B2

(12) United States Patent
Kwon et al.

(10) Patent No.: US 10,640,141 B2
(45) Date of Patent: May 5, 2020

(54) TILT APPARATUS FOR VEHICULAR STEERING COLUMN

(71) Applicant: MANDO CORPORATION, Pyeongtaek-si, Gyeonggi-do (KR)

(72) Inventors: HyunBi Kwon, Yongin-si (KR); Sang Hyun Park, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 134 days.

(21) Appl. No.: 15/878,986

(22) Filed: Jan. 24, 2018

(65) Prior Publication Data

US 2018/0208231 A1     Jul. 26, 2018

(30) Foreign Application Priority Data

Jan. 26, 2017 (KR) .......................... 10-2017-0012715
Mar. 17, 2017 (KR) .......................... 10-2017-0033853

(51) Int. Cl.
    *B62D 1/184*     (2006.01)
    *B62D 1/189*     (2006.01)

(52) U.S. Cl.
    CPC .............. *B62D 1/184* (2013.01); *B62D 1/189* (2013.01)

(58) Field of Classification Search
    CPC ......... B62D 1/184; B62D 1/189; B62D 1/187
    See application file for complete search history.

(56) References Cited

U.S. PATENT DOCUMENTS 5,722,299 A * 3/1998 Yamamoto ............. B62D 1/184
                                                            280/775
5,743,150 A * 4/1998 Fevre ..................... B62D 1/184
                                                             280/775

(Continued)

FOREIGN PATENT DOCUMENTS

CN        105711636 A     6/2016
DE     102005036582 A1     2/2007

(Continued)

OTHER PUBLICATIONS

German Office Action dated Feb. 21, 2019 issued in German Patent Application No. 102018201029.3.

(Continued)

*Primary Examiner* — Paul N Dickson
*Assistant Examiner* — Timothy Wilhelm
(74) *Attorney, Agent, or Firm* — Morgan, Lewis & Bockius LLP

(57) ABSTRACT

Embodiments disclosed herein provide a tilt apparatus for a vehicular steering column. The tilt apparatus includes: a tilt bracket including a tilt guide portion supported on an outer side of a distance bracket and having a first tilt hole in the tilt guide portion; a fixed gear including a second tilt hole communicating with the first tilt hole and a first screw portion having a thread peak and a thread valley on opposite side ends thereof, the fixed gear being installed outside the tilt guide portion and the first screw portion being spaced apart from the tilt guide portion; a movable gear including a second screw portion having a thread peak and a thread valley to be meshed with or separated from the first screw portion during a tilt operation of an adjusting lever; and a lever bolt configured to rotate in cooperation with the adjusting lever and installed through the first tilt hole, the second tilt hole, and the movable gear.

12 Claims, 8 Drawing Sheets

(56) References Cited

U.S. PATENT DOCUMENTS

| | | | | |
|---|---|---|---|---|
| 6,092,957 A * | 7/2000 | Fevre | | B62D 1/184 280/775 |
| 6,139,057 A * | 10/2000 | Olgren | | B62D 1/184 280/775 |
| 6,390,717 B1 * | 5/2002 | Bar | | B62D 1/184 280/775 |
| 6,419,269 B1 * | 7/2002 | Manwaring | | B62D 1/184 280/775 |
| 7,150,204 B2 * | 12/2006 | Uphaus | | B62D 1/184 74/493 |
| 7,484,430 B2 * | 2/2009 | Schulz | | B62D 1/184 280/777 |
| 7,635,149 B2 * | 12/2009 | Menjak | | B62D 1/184 280/775 |
| 7,685,903 B2 * | 3/2010 | Streng | | B62D 1/184 74/492 |
| 7,752,940 B2 * | 7/2010 | Lutz | | B62D 1/184 280/775 |
| 7,861,615 B2 * | 1/2011 | Harris | | B62D 1/187 280/775 |
| 8,006,587 B2 * | 8/2011 | Schnitzer | | B62D 1/184 74/493 |
| 8,327,733 B2 * | 12/2012 | Ozsoylu | | B62D 1/184 280/775 |
| 8,413,541 B2 * | 4/2013 | Davies | | B62D 1/184 280/777 |
| 8,474,869 B2 * | 7/2013 | Sulser | | B62D 1/184 280/775 |
| 8,505,408 B2 * | 8/2013 | Havlicek | | B62D 1/195 280/775 |
| 8,671,795 B2 * | 3/2014 | Ozsoylu | | B62D 1/184 74/493 |
| 8,827,311 B2 * | 9/2014 | Schnitzer | | B62D 1/184 188/371 |
| 9,187,116 B2 * | 11/2015 | Yokota | | B62D 1/192 |
| 9,446,781 B2 * | 9/2016 | Tanaka | | B62D 1/187 |
| 9,469,330 B2 * | 10/2016 | Tanaka | | B62D 1/184 |
| 9,580,100 B2 * | 2/2017 | Tomiyama | | B62D 1/187 |
| 9,604,663 B2 * | 3/2017 | Tomiyama | | B62D 1/187 |
| 9,718,490 B2 * | 8/2017 | Tanaka | | B62D 1/184 |
| 9,840,269 B2 * | 12/2017 | Tanaka | | B62D 1/189 |
| 9,840,270 B2 * | 12/2017 | Tomiyama | | B62D 1/184 |
| 10,005,485 B2 * | 6/2018 | Kurz | | B62D 1/184 |
| 10,196,080 B2 * | 2/2019 | Kim | | B62D 1/184 |
| 10,202,139 B2 * | 2/2019 | Tanaka | | B62D 1/184 |
| 2004/0035238 A1 * | 2/2004 | Jolley | | B62D 1/184 74/493 |
| 2004/0261565 A1 * | 12/2004 | Uphaus | | B62D 1/184 74/493 |
| 2008/0178702 A1 * | 7/2008 | Lutz | | B62D 1/184 74/493 |
| 2010/0275721 A1 * | 11/2010 | Davies | | B62D 1/184 74/493 |
| 2011/0041642 A1 * | 2/2011 | Havlicek | | B62D 1/184 74/493 |
| 2016/0176436 A1 | 6/2016 | Ku | | |
| 2017/0203780 A1 * | 7/2017 | Davies | | B62D 1/184 |
| 2017/0313345 A1 * | 11/2017 | Tanaka | | B62D 1/184 |

FOREIGN PATENT DOCUMENTS

| | | |
|---|---|---|
| KR | 10-2013-0098813 A | 9/2013 |
| KR | 10-2016-0139162 A | 12/2016 |
| WO | 2017009568 A1 | 1/2017 |

OTHER PUBLICATIONS

Korean Office Action dated Aug. 17, 2018 issued in Korean Patent Application No. 100-2017-0033853.

Chinese Office Action issued in Chinese Patent Application No. 201810075868.6, dated Dec. 9, 2019 (with English translation).

* cited by examiner

TILT APPARATUS FOR VEHICULAR STEERING COLUMN

CROSS REFERENCE TO RELATED APPLICATION

This application claims priority from Korean Patent Application No. 10-2017-0012715, filed on Jan. 26, 2017, and Korean Patent Application No. 10-2017-0033853, filed on Mar. 17, 2017, which are hereby incorporated by reference for all purposes as if fully set forth herein.

BACKGROUND OF THE INVENTION

1. Field of the Invention

Embodiments disclosed herein relate to a vehicular steering column, and more particularly to a tilt apparatus for a vehicular steering column.

2. Description of the Prior Art

Recent vehicles have a steering column to which a telescope or tilt function is added for the convenience of the driver. A telescope device is a device that allows the steering column to extend and contract in the axial direction, and a tilt device is a device that adjusts the angle of the steering column.

The tilt operation of the steering column is applied by tightening and releasing an adjusting lever. When the adjusting lever is tightened, a movable gear is meshed with a fixed gear by a tightening force of a lock unit coupled to an end of a lever bolt, so that the tilt operation is not performed. In contrast, when the adjustment lever is released, the meshed state between the fixed gear and the movable gear is released, so that the tilt operation is enabled.

However, a conventional vehicular steering column has a problem in that when the tilt operation is performed, the steering column is not locked due to a tooth-on-tooth phenomenon of the gears in which the peaks of the movable gear are engaged with the peaks of the fixed gear. In such a case, the driver's lever operation feeling deteriorates, and in severe cases, the lever or the gears may be damaged, which may cause the driver to feel uncomfortable.

In addition, the steering column is not stably fixed due to the tooth-on-tooth phenomenon of the gears. Thus, when the vehicle collides, the steering column pops up in the tilt direction, and the driver's safety is not ensured.

SUMMARY OF THE INVENTION

Embodiments disclosed herein provide a tilt apparatus for a vehicular steering column, which enables the steering column to be stably locked even if a tooth-on-tooth phenomenon occurs between a fixed gear and a movable gear when tilt-locked by a driver.

The embodiments are not limited to those described above, and other aspects and advantages of the present disclosure which are not mentioned here can be understood based on the following description.

A tilt apparatus for a vehicular steering column according to embodiments disclosed herein may include: a tilt bracket including a tilt guide portion supported on an outer side of a distance bracket and having a first tilt hole in the tilt guide portion; a fixed gear including a second tilt hole communicating with the first tilt hole and a first screw portion having a thread peak and a thread valley on opposite side ends thereof, the fixed gear being installed outside the tilt guide portion and the first screw portion being spaced apart from the tilt guide portion; a movable gear including a second screw portion having a thread peak and a thread valley to be meshed with or separated from the first screw portion during a tilt operation of an adjusting lever; and a lever bolt configured to rotate in cooperation with the adjusting lever and installed through the first tilt hole, the second tilt hole, and the movable gear.

According the embodiments disclosed herein, even if a tooth-on-tooth phenomenon occurs between the fixed gear and the movable gear, a driver can be provided with a stable lever operation feeling by the elastic force of the fixed gear, a portion of which is installed to be spaced apart from the tilt bracket. Further, since it is possible to prevent a phenomenon in which the steering column pops up due to an external impact or the like in the event of a vehicle collision, the driver's safety can be assured.

It should be understood that the effects of the embodiments are not limited to the effects described above and include all effects that can be deduced from the detailed description of the embodiments or the configurations of the disclosure described in the claims.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
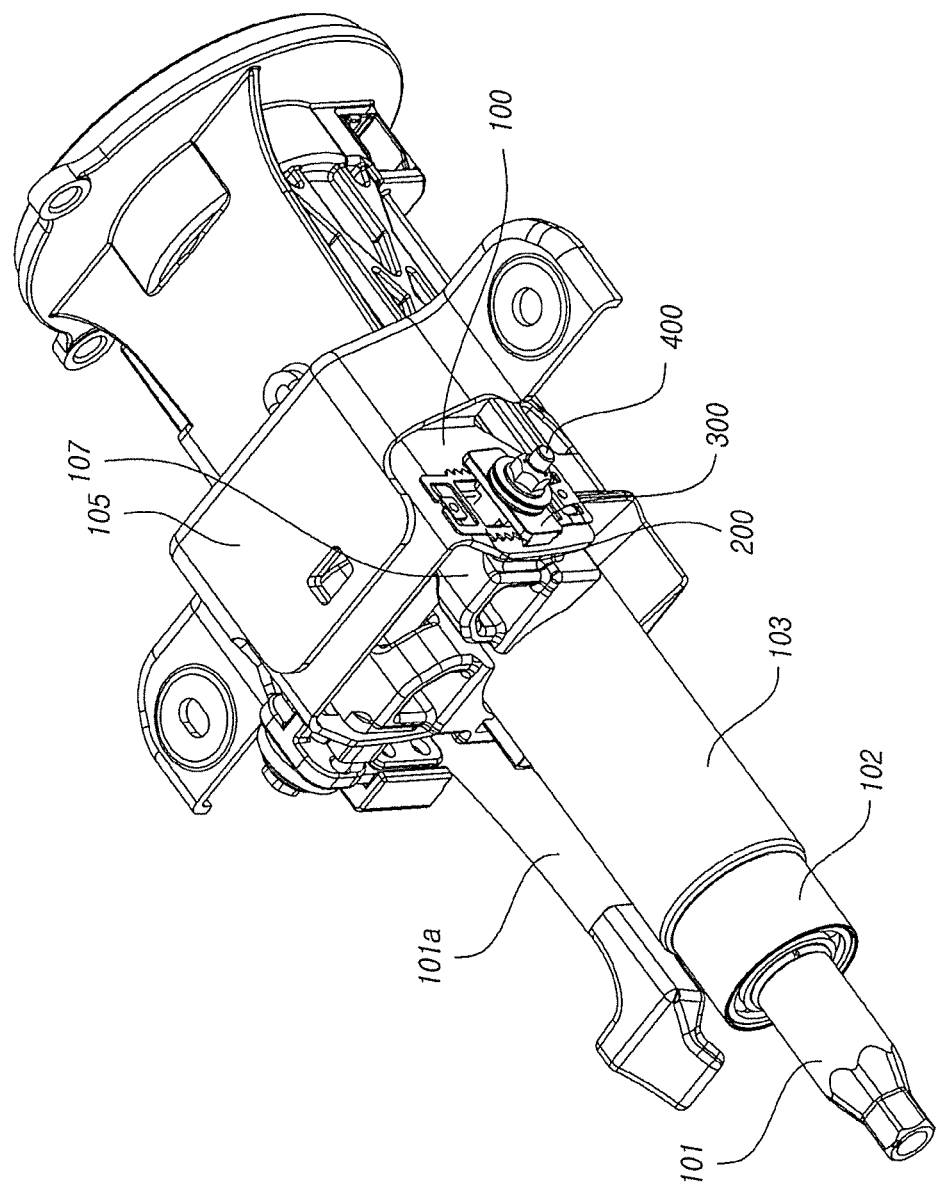
FIG. 1 is a perspective view illustrating a vehicular steering column according to embodiments disclosed herein.

Hereinafter, embodiments will be described with reference to the accompanying drawings. However, the present disclosure may be implemented in various different forms and is not limited to embodiments described herein. Further, parts irrelevant to the present disclosure are omitted in the drawings to make the present disclosure clear and the same reference numerals are designated to the same or similar components throughout the specification.

Throughout the specification, when it is described that an element is "connected" to another element, not only the first element may be "connected directly" to the second element, but the first element may also be "electrically connected" to the second element while a third element is interposed therebetween. In the entire specification of the present application, when it is described that a certain unit "includes" a certain element, this means that the unit may include any other element rather than exclude the any other element unless otherwise described.

Hereinafter, embodiments will be described in detail with reference to the accompanying drawings.

Figure 2:
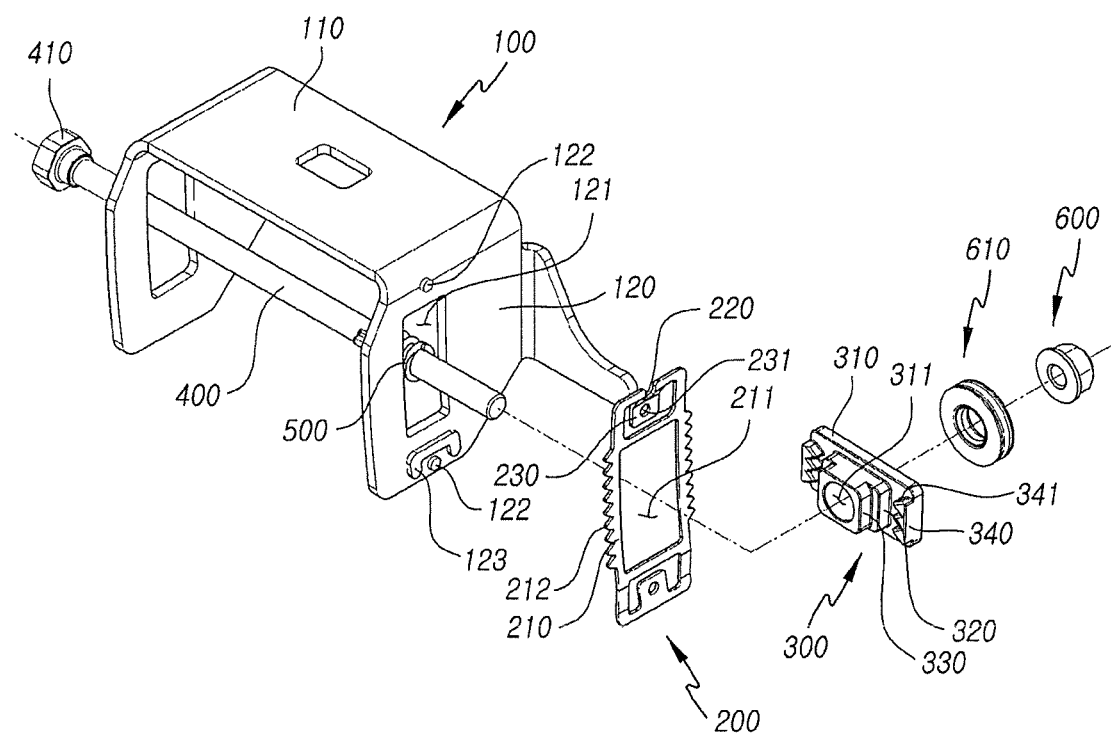
FIG. 2 is an exploded perspective view illustrating a tilt apparatus for the steering column according to the embodiments.
Figure 3:
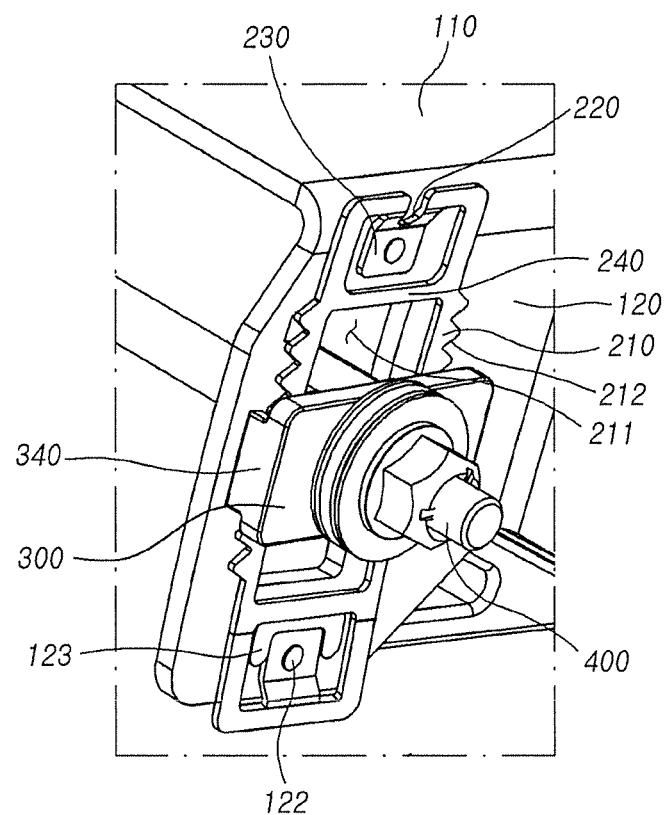
FIG. 3 is a perspective view illustrating a coupled state of the tilt apparatus for the steering column according to the present embodiments.
Figure 4:
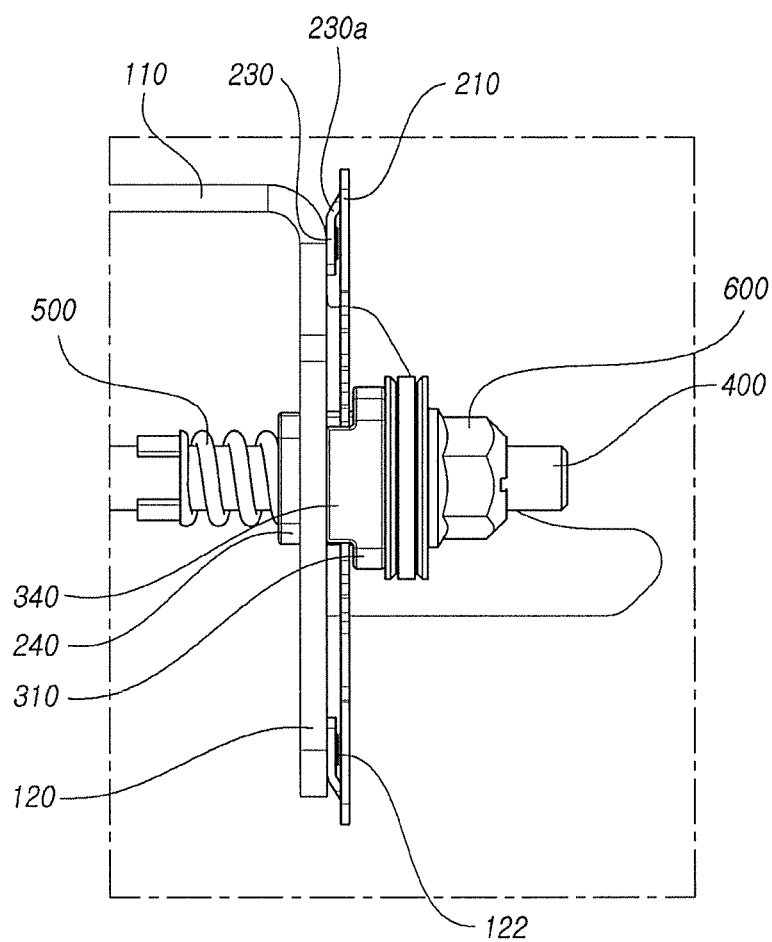
FIG. 4 is a side view illustrating the coupled state of the tilt apparatus for the steering column according to the present embodiments.
Figure 5:
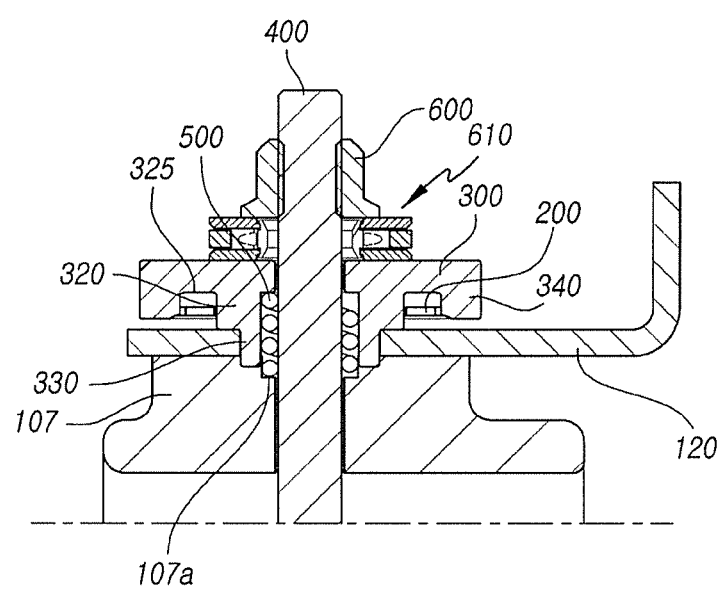
FIG. 5 is a cross-sectional view illustrating the coupled state of the tilt apparatus for the steering column according to the present embodiments.
Figure 6:
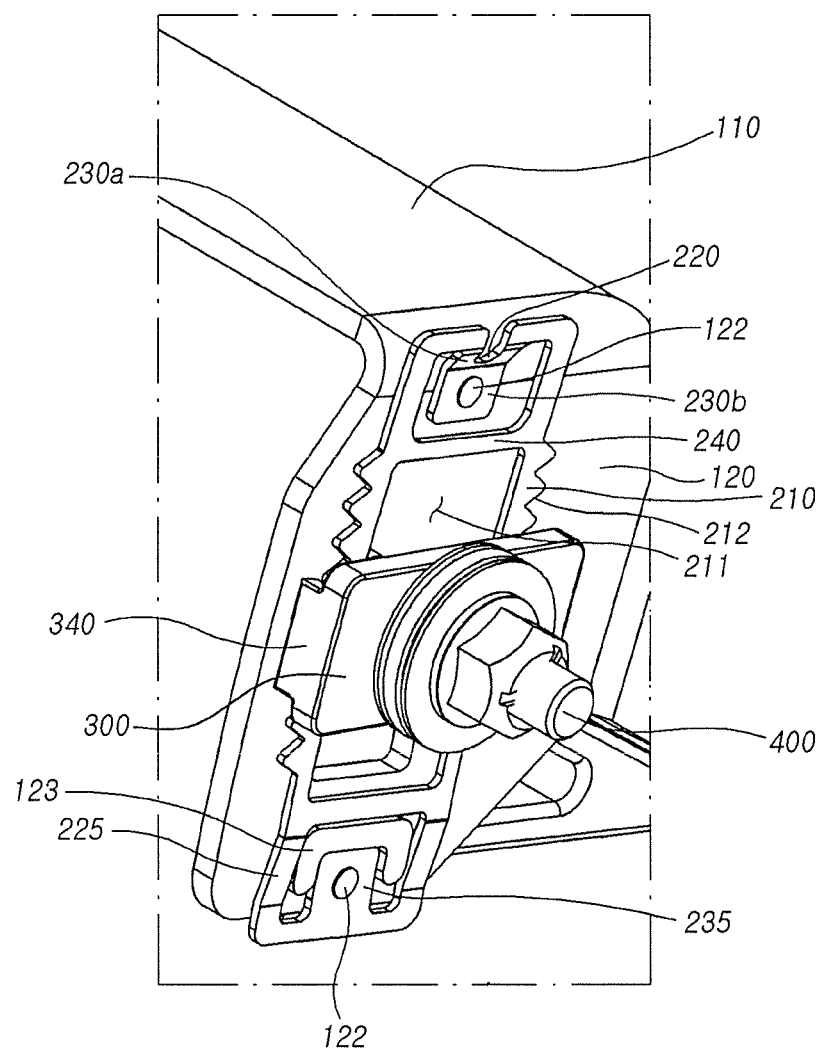
FIG. 6 is a perspective view illustrating a coupled state of the tilt apparatus for the steering column according to the present embodiments.
Figure 7:
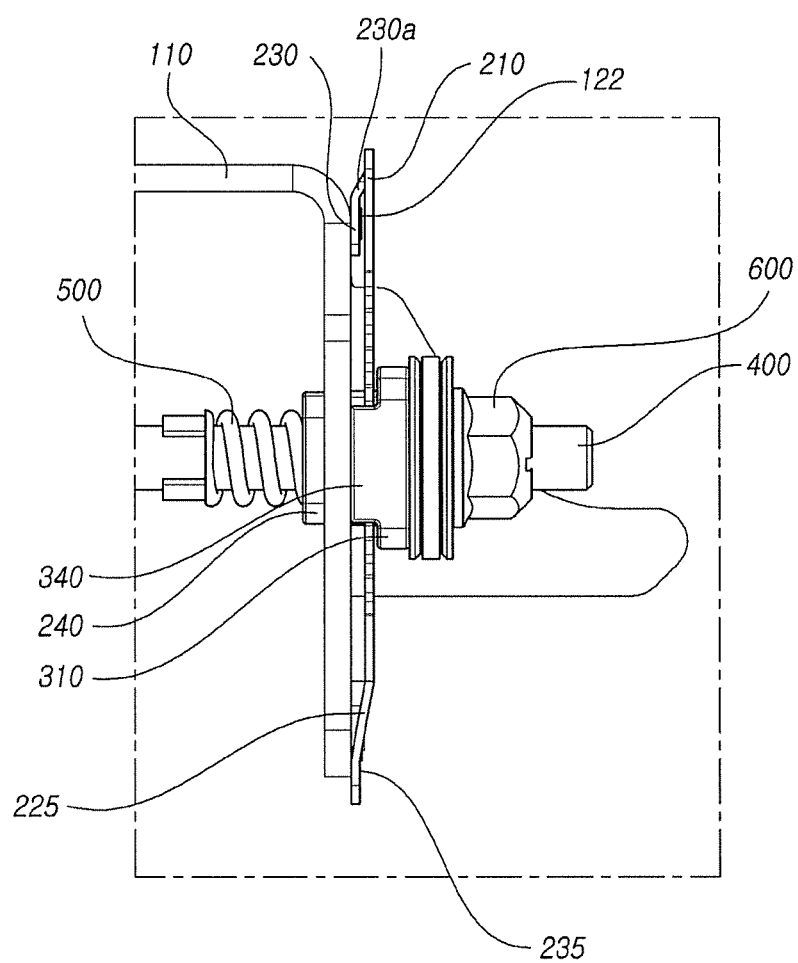
FIG. 7 is a side view illustrating the coupled state of the tilt apparatus for the steering column according to the present embodiments.
Figure 8:
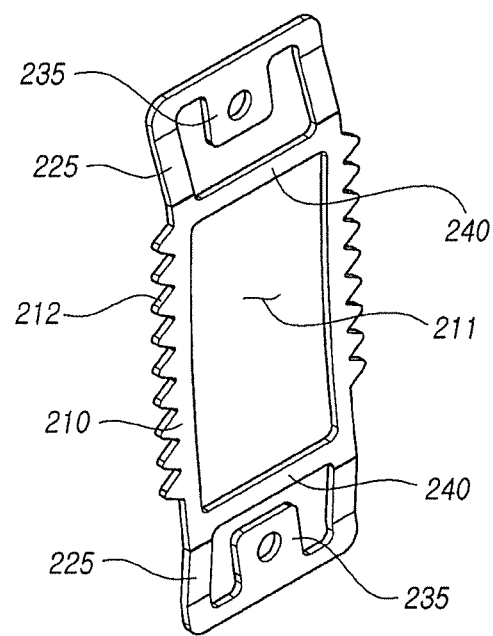
FIG. 8 is a perspective view illustrating a part of the tilt apparatus for the steering column according to the present embodiments.

FIG. 1 is a perspective view illustrating a vehicular steering column according to embodiments disclosed herein, FIG. 2 is an exploded perspective view illustrating a tilt apparatus for the steering column according to the embodiments, and FIG. 3 is a perspective view illustrating a coupled state of the tilt apparatus for the steering column according to the present embodiments. FIG. 4 is a side view illustrating the coupled state of the tilt apparatus for the steering column according to the present embodiments, FIG. 5 is a cross-sectional view illustrating the coupled state of the tilt apparatus for the steering column according to the present embodiments, and FIG. 6 is a perspective view illustrating a coupled state of the tilt apparatus for the steering column according to the present embodiments. FIG. 7 is a side view illustrating the coupled state of the tilt apparatus for the steering column according to the present embodiments, and FIG. 8 is a perspective view illustrating a part of the tilt apparatus for the steering column according to the present embodiments.

Referring to the drawings, a tilt apparatus for a steering column according to the embodiments includes a tilt bracket 100, a fixed gear 200, a movable gear 300, a lever bolt 400, and a lock unit 600.

First, referring to FIG. 1, the steering column according to the embodiments includes an inner tube 102 coupled to the outside of the steering shaft 101, and an outer tube 103 coupled to the outside of the inner tube 102. Each of the inner tube 102 and the outer tube 103 may be made of a cylindrical hollow body, and the inner tube 102 is inserted into the outer tube 103.

Thus, the inner tube 102 is introduced into the outer tube 103 or drawn out of the outer tube 103. A distance bracket 107 and the tilt bracket 100 are provided on the outer circumference side of the outer tube 103 and are fixed to the vehicle body by a mount bracket 105.

The tilt bracket 100 is installed between the distance bracket 107 and the mount bracket 105 of the steering column. The distance bracket 107 is fixedly coupled to the outer tube 103 so as to guide the radial expansion or contraction movement of the steering column during the tilt operation.

The tilt bracket 100 includes a base portion 110 in the form of a flat plate coupled to one side of the mount bracket 105 (the lower side of the mount bracket in reference to FIG. 1), and tilt guide portions 120 supported outside the distance bracket 107 on the opposite sides of the base portion 110. For example, the tilt bracket 100 may have a cross-sectional shape "Π".

Each of the tilt guide portions 120 has a first tilt hole 121, which is elongated in the tilt direction of the steering column (upward and downward with respect to the steering column in the drawing). A fixed gear 200 and a movable gear 300 are disposed on the outer side of one tilt guide portion 120. An adjusting lever 101a configured to rotate the lever bolt 400 and a cam unit operated to be extended or retracted in the axial direction of the lever bolt 400 are disposed on the outer side of the other tilt guide portion.

In addition, a coupling protrusion 122 coupled to the movable gear 300 protrudes from the outer surface of the one tilt guide portion 120. Two coupling protrusions 122 may be disposed above and below the first tilt hole 121.

In addition, a stopper 123 configured to limit the play of the movable gear 300 may be disposed on the outer surface of the one tilt guide portion 120. The stopper 123 may be disposed at a position adjacent to at least one of the two coupling protrusions. For example, although the stopper 123 is disposed between the first tilt hole 121 and the coupling protrusion 122 located at the lower side of the first tilt hole 121 in the embodiments, the present disclosure is not necessarily limited to this. Stoppers may be disposed at both of the positions adjacent to the coupling protrusions which are disposed above and below the first tilt hole.

The lever bolt 400 is coupled with the adjusting lever 101a and is rotated in cooperation with the adjusting lever 101a, thereby enabling the tilt operation of the steering column according to the operation of the adjusting lever. A cam unit may be interposed between the adjusting lever and the lever bolt 400.

The lever bolt 400 is installed through the opposite tilt guide portions 120 of the tilt bracket 100. One end of the lever bolt 400 protrudes to the outside of the one tilt guide portion 120, and screw threads may be disposed on the outer circumferential surface of the protruding lever bolt 400 so that the lock unit 600 or 610 is coupled thereto.

At this time, an elastic member 500 is coupled to one end of the lever bolt 400, and the elastic member 500 is disposed between the distance bracket 107 and the movable gear 300. That is, the elastic member 500 is supported by a fixing groove 107a in the distance bracket 107 so as to elastically support the movable gear 300, so that the movable gear 300 is able to ensure a sufficient distance from the fixed gear 200 during the release operation of the adjusting lever. The elastic member 500 may be a coil spring coupled to the outer circumferential surface of the lever bolt 400.

Meanwhile, a head 410, which has a diameter having a diameter larger than the diameter of the lever bolt 400, may be provided at the other end of the lever bolt 400. In this case, the head 410 may be coupled to the adjusting lever 101a by the cam unit or the like between the head 410 and the tilt guide portion 120.

The fixed gear 200 is coupled to the outer surface of the one tilt guide portion 120. The fixed gear 200 includes a fixed gear body 210 having a substantially rectangular shape and fixing portions 230 connected to the upper and lower ends of the fixed gear body 210 to be coupled to the tilt guide portion 120.

The fixed gear body 210 is disposed to be spaced apart from the tilt guide portion 120 a predetermined distance, and a second tilt hole 211 is disposed in the center of the fixed gear body 210 to correspond to the first tilt hole 121 of the tilt guide portion 120.

First screw portions 212, each of which includes peaks and valleys of screws, are provided on opposite outer side surfaces of the fixed gear body 210 spaced apart from the tilt guide portion 120 to be meshed with the movable gear 300. One or more reinforcing ribs 240 may be disposed on the fixed gear body 210 in order to increase the rigidity of the fixed gear body 210. The reinforcing ribs 240 may be provided between the second tilt hole 211 and the fixing portions 230 so as to interconnect the opposite side ends 210 of the fixed gear body 210.

The fixing portions 230 are fixed to the tilt guide portion 120 and are connected to the fixed gear body 210 by bent portions 230a. The bent portions 230a are inclined at the end portions of the fixed gear body 210 so that the fixing portions 230 are stepped with the fixed gear body 210. By the bent portions 230a, the fixed gear body 210 and the fixing portions 230 are stepped with each other to be spaced apart from each other.

Accordingly, the fixed gear body 210 and the first screw portions 212 may be spaced apart from the tilt guide portion 120. Coupling holes 231 may be disposed in the fixing portions 230 such that the coupling protrusions 122 are correspondingly coupled to the coupling holes 231.

The fixing portions 230 are connected to the end portions of the fixed gear body portion 210 by the bent portions 230a and are disposed between the opposite side ends of the fixed gear body portion 210 and the second tilt hole 211, and the stopper 123 is coupled to a space between the fixed gear body 210 and the fixing portion 230 so as to more stably restrict the play of the fixed gear.

The movable gear 300 is coupled to the fixed gear 200 so as to fix the steering column. The movable gear 300 includes a movable gear body 310 disposed to face the outer side of the fixed gear body 210 and having a substantially flat plate shape, a support 320 protruding from the center of one side surface of the movable gear body 310 to be in contact with and supported by the fixed gear body 210, and tooth portions 340 protruding toward the fixed gear 200 on opposite side ends of one side surface of the movable gear body 310 and having second screw portions 341 on surfaces which face each other.

The support 320 protrudes from the movable gear body 310 to come into contact with the fixed gear body 210 and presses the fixed gear body 210 when the lever bolt 400 is locked. A guide portion 330 may protrude toward the fixed gear 200 from the center of the support 320, and the guide portion 330 is inserted into the second tilt hole 211 in the fixed gear 200, so that the guide portion 330 is guided by the second tilt hole 211 when the movable gear 300 moves up and down.

A bolt hole 311 is disposed in the center of the guide portion 330 so that the lever bolt 400 passes therethrough. The tooth portions 340 protrude from both ends of the movable gear body 310 in the direction of the fixed gear 200. The second screw portions 341 are disposed on the facing surfaces of the respective tooth portions 340 to be meshed with the first screw portions 212 of the fixed gear 200.

The lock unit 600 and 610 is coupled to the end of the lever bolt 400 protruding to the outside of the movable gear 300. For example, the lock unit 600 may include a lock nut 600 coupled to the end of the lever bolt 400, and a bearing 610 or a washer may be interposed between the movable gear 300 and the lock nut 600.

The operation of the tilt apparatus for a steering column configured as described above will be described below.

First, when the lever bolt 400 is rotated in one direction by the operation of the adjusting lever and the fastening with the lock unit 600 and 610 is released, the movable gear 300 is spaced apart from the fixed gear 200 by the restoring force of the elastic member 500 by the moving amount of the cam unit, thereby releasing the tilt lock state, so that the driver can perform the tilting operation of the steering column.

On the contrary, the driver should convert the tiltable state to the tilt lock state after adjusting the angle of the steering column to match his/her body shape. When the lever bolt 400 is rotated in the opposite direction by the operation of the adjusting lever, the lever bolt 400 and the lock units 600 and 610 are fastened to each other, and the movable gear 300 is engaged with the fixed gear 200 while compressing elastic member 500.

During the tilt lock state, a tooth-on-tooth phenomenon occurs in which the thread peaks of the movable gear 300 are engaged with the thread peaks of the fixed gear 200. In this case, the second screw portion 341 of the movable gear 300 presses the fixed gear body 210 and the fixed gear body 210 is elastically deformed toward the tilt guide portion 120 side, so that tilt lock is performed. At this time, when a predetermined impact is applied to the steering column, the thread peaks of the movable gear 300 slides to be meshed with the thread valleys of the fixed gear 200, so that the steering column can be stably restrained.

At this time, a slit 220 may be provided in the fixed gear body 210 from an end of the fixed gear body 210 to the bent portion 230a, so that the fixed gear body 210 can be elastically deformed more easily.

Meanwhile, the fixed gear 200 needs to have sufficient strength and elasticity such that a tilt lock operation can be performed even if a tooth-on-tooth phenomenon occurs between the fixed gear 200 and the movable gear 300. Accordingly, a portion of the fixed gear 200 is coupled to the tilt bracket 100 in the state of being spaced apart from the tilt bracket 100, and the spaced portion exerts an elastic force even when the tooth-on-tooth phenomenon occurs between the fixed gear 200 and the movable gear 300. In addition, the fixed gear 200 may be made of a material having sufficient strength and elasticity, for example a spring steel.

As described above, according the embodiments disclosed herein, even if the tooth-on-tooth phenomenon occurs between the fixed gear 200 and the movable gear 300, since it is possible to prevent a phenomenon in which tilt lock between the fixed gear 200 and the movable gear 300 is not performed by the elastic force of the fixed gear 200, a driver can be provided with a stable lever operation feeling. Further, since it is possible to prevent a phenomenon in which the steering column pops up due to an external impact or the like in the event of a vehicle collision, the driver's safety can be assured.

Meanwhile, referring to FIGS. 6 to 8, in order to cause the movable gear body 210 and the first screw portion 212 to be spaced apart from the tilt guide portion 120 in the tilt apparatus for a steering column according to the embodiments disclosed herein, bent fixing parts 230b or flat fixing portions 235 may be disposed on the upper and lower portions of the movable gear body 210. Here, since the configurations of the tilt bracket 100, the movable gear 300, the lever bolt 400, and the lock unit 600 and 610 are the same as or similar to those described above, the detailed descriptions thereof will be omitted.

First, referring to FIGS. 6 and 7, the fixed gear 200 applied to the tilting apparatus for a steering column according to the present embodiment includes: a fixed gear body 210 disposed to be spaced apart from a tilt guide portion 120, having a second tilt hole 211 in the center thereof and first screw portions 212 on outer surfaces of opposite side ends thereof; a bent fixing portion 230b provided on any one of upper and lower portions of the fixed gear body 210 and connected to an end of the fixed gear body 210, in which the bent fixing portion 230b is slit such that an empty space is provided between opposite side ends of the bent fixing portion and the second tilt hole 211, and is bent toward and coupled to the tilt guide portion 120; and a flat fixing portion 235 provided on a remaining one of the upper and lower portions of the fixed gear body 210, in which the fixed gear body 210 is bent toward the tilt guide portion 120, the flat fixing portion 235 is connected to a bent end portion and is slit such that an empty space is provided between opposite side ends of the flat fixing portion 235 and a second tilt hole 211, and the flat fixing portion 235 is coupled to the tilt guide portion 120.

That is, the bent fixing portion 230b is provided in the upper portion of the fixed gear body 210 and the flat fixing portion 235 may be provided in the lower portion of the fixed gear body 210. On the contrary, the flat fixing portion 235 may be provided in the upper portion of the fixed gear body 210 and the bent fixing portion 230b may be provided in the lower portion of the fixed gear body 210 is provided with the fixing portion 235. FIGS. 6 and 7 illustrate a case in which the flat fixing portion 235 is provided in the lower portion of the fixed gear body 210, as an example.

Here, the bent fixing portion 230b is provided in the bent portion 230a bent at the end of the fixed gear body portion 210 and is the same as the fixing portion 230 illustrated in FIGS. 2 to 5. Thus, a detailed description thereof is omitted.

The flat fixing portion 235 is provided in the end portion where the fixed gear body portion 210 is bent toward the tilt guide portion 120 and is connected to the end portion of the fixed gear body 210. The flat fixing portion 235 is slit such that an empty space is provided between the opposite inclined portions 225 of the fixed gear body 210 and the second tilt hole 211, and the flat fixing portion 235 has a flat shape to be coupled to the tilt guide portion 120.

Accordingly, the first screw portion 212 may be spaced apart from the tilt guide portion 120 along the inclined portions 225 of the fixed gear body 210 in the surface where the flat fixing portion 235 is fixed to the tilt guide portion 120.

In addition, the flat fixing portion 235 may be provided on both the upper and lower portions of the fixed gear body 210 as illustrated in FIG. 8.

Accordingly, the fixed gear body 210 and the first screw portions 212 are spaced apart from the tilt guide portion 120 by a predetermined distance, and the second tilt hole 211 is disposed in the center of the fixed gear body 210 to correspond to the first tilt hole 121 in the tilt guide portion 120 and is coupled to the movable gear 300. Accordingly, the fixed gear body 210 can be spaced apart from the tilt guide portion 120.

The description of the above-described embodiments is for illustrative purposes only, and it will be understood by a person skilled in the art to which the embodiments are belonging that various changes in detailed form can be made without changing the technical spirit and essential features of the embodiments.

That is, it should be understood that the embodiments described above are illustrative in all aspects and not restrictive. For example, each component described as a single form may be implemented in a distributed form, and components described as being distributed may also be implemented in a combined form.

The scope of the embodiments is defined by the appended claims as described below. Accordingly, it will be appreciated that all modifications or variations derived from the meaning and scope of the appended claims and their equivalents are included in the range of the present disclosure.

What is claimed is:

1. A tilt apparatus for a vehicular steering column, comprising:
a tilt bracket comprising a tilt guide portion supported on an outer side of a distance bracket and having a first tilt hole in the tilt guide portion;
a fixed gear comprising a second tilt hole communicating with the first tilt hole and a first screw portion having a thread peak and a thread valley on opposite side ends thereof, the fixed gear being installed outside the tilt guide portion and the first screw portion being spaced apart from the tilt guide portion;
a movable gear comprising a second screw portion having a thread peak and a thread valley to be meshed with or separated from the first screw portion during a tilt operation of an adjusting lever; and
a lever bolt configured to rotate in cooperation with the adjusting lever and installed through the first tilt hole, the second tilt hole, and the movable gear,
wherein the fixed gear comprises:
a fixed gear body spaced apart from the tilt guide portion; and
a fixing portion disposed on at least one of upper or lower portions of the fixed gear body, the fixing portion being bent to be spaced apart from the fixed gear body and coupled to the tilt guide portion.

2. The tilt apparatus of claim 1, wherein the second tilt hole is disposed in a center of the fixed gear body and the first screw portion is disposed on each of outer surfaces of opposite side ends of the fixed gear body.

3. The tilt apparatus of claim 2, wherein the tilt guide portion has a coupling protrusion disposed on an outer surface thereof, and the fixing portion has a coupling hole which is correspondingly coupled to the coupling protrusion.

4. The tilt apparatus of claim 2, wherein the fixing portion is connected to an end portion of the fixed gear body, and is slit such that an empty space is defined between opposite side ends of the fixing gear body and the second tilt hole.

5. The tilt apparatus of claim 4, further comprising:
a stopper protruding from the outer surface of the tilt guide portion so as to limit play of the movable gear.

6. The tilt apparatus of claim 5, wherein the stopper is coupled to the space between the fixed gear body and the fixing portion.

7. The tilt apparatus of claim 5, wherein the stopper is disposed to enclose an end portion and opposite side ends of the fixing portion so that the end portion of the fixing portion is supported by the stopper.

8. The tilt apparatus of claim 4, wherein the fixed gear body includes a reinforcing rib connecting the opposite side ends of the fixed gear body between the second tilt hole and the fixing portion.

9. The tilt apparatus of claim 1, wherein the movable gear comprises:
a movable gear body disposed to face an outer side of the fixed gear body;
a support protruding from a surface of the movable gear body, the support being in contact with and supported by the fixed gear body; and
a tooth portion having the second screw portion disposed on each of facing surfaces, which protrude toward the fixed gear from opposite side ends of the opposite surfaces of the movable gear body.

10. The tilt apparatus of claim 9, further comprising:
a guide portion protruding from the support to be inserted into the first tilt hole and the second tilt hole.

11. A tilt apparatus for a vehicular steering column, comprising:
a tilt bracket comprising a tilt guide portion supported on an outer side of a distance bracket and having a first tilt hole in the tilt guide portion;
a fixed gear comprising a second tilt hole communicating with the first tilt hole and a first screw portion having a thread peak and a thread valley on opposite side ends thereof, the fixed gear being installed outside the tilt guide portion and the first screw portion being spaced apart from the tilt guide portion;

a movable gear comprising a second screw portion having a thread peak and a thread valley to be meshed with or separated from the first screw portion during a tilt operation of an adjusting lever; and a lever bolt configured to rotate in cooperation with the adjusting lever and installed through the first tilt hole, the second tilt hole, and the movable gear, wherein the fixed gear comprises:

a fixed gear body spaced apart from the tilt guide portion, the second tilt hole being disposed in a center of the fixed gear body and the first screw portion being provided on each of outer surfaces of opposite side ends thereof;

a bent fixing portion arranged in any one of upper and lower portions of the fixed gear body and connected to the a first end portion of the fixed gear body, the bent fixing portion being slit such that an empty space is defined between the opposite side ends and the second tilt hole, and the bent fixing portion being bent toward and coupled to the tilt guide portion; and a flat fixing portion arranged in a remaining one of the upper and lower portions of the fixed gear body and connected to a second end of the fixing gear body being bent toward the tilt guide portion, the flat fixing portion being slit such that an empty space is defined between the opposite side ends and the second tilt hole, and the flat fixing portion being coupled to the tilt guide portion.

12. A tilt apparatus for a vehicular steering column, comprising:

a tilt bracket comprising a tilt guide portion supported on an outer side of a distance bracket and having a first tilt hole in the tilt guide portion;

a fixed gear comprising a second tilt hole communicating with the first tilt hole and a first screw portion having a thread peak and a thread valley on opposite side ends thereof, the fixed gear being installed outside the tilt guide portion and the first screw portion being spaced apart from the tilt guide portion;

a movable gear comprising a second screw portion having a thread peak and a thread valley to be meshed with or separated from the first screw portion during a tilt operation of an adjusting lever; and a lever bolt configured to rotate in cooperation with the adjusting lever and installed through the first tilt hole, the second tilt hole, and the movable gear, wherein the fixed gear comprises:

a fixed gear body spaced apart from the tilt guide portion, the second tilt hole being disposed in a center of the fixed gear body and the first screw portion being disposed on each of outer surfaces of opposite side ends thereof; and a flat fixing portion arranged in each of the upper and lower portions of the fixed gear body, each of the upper and lower portions of the fixing gear body being bent toward the tilt guide portion, wherein the flat fixing portion is connected to each of the upper and lower portions of the fixing gear body, the flat fixing portion being slit such that an empty space is defined between the opposite side ends and the second tilt hole, and the flat fixing portion being coupled to the tilt guide portion.

* * * * *